United States Patent
Langemann et al.

[11] Patent Number: 5,883,584
[45] Date of Patent: Mar. 16, 1999

[54] EARTH OBSERVATION METHOD

[75] Inventors: Manfred Langemann, Stetten; Uwe Mallow, Friedrichshafen; Rudolf Benz, Immenstaad; Harald Schüssler, Meersburg, all of Germany

[73] Assignee: Dornier GmbH, Germany

[21] Appl. No.: 65,346

[22] Filed: May 21, 1993

[30] Foreign Application Priority Data

May 21, 1992 [DE] Germany ............................ 42 16 828.7

[51] Int. Cl.⁶ ............................ G08C 19/16; H04N 7/18; H04N 9/47
[52] U.S. Cl. .................... 340/870.01; 348/143; 348/144; 455/12.1
[58] Field of Search ............................ 340/870.01, 870.1; 348/117, 143, 144, 145, 147; 342/352, 357; 455/12.1

[56] References Cited

U.S. PATENT DOCUMENTS

| | | | |
|---|---|---|---|
| 3,808,361 | 4/1974 | Hofmann | 348/145 |
| 4,405,943 | 9/1983 | Kanaly . | |
| 4,814,607 | 3/1989 | Hofmann | 348/145 |
| 5,027,199 | 6/1991 | Suzuki | 348/144 |
| 5,045,937 | 9/1991 | Myrick | 348/144 |
| 5,134,473 | 7/1992 | Nagura | 348/144 |
| 5,138,444 | 8/1992 | Hiramatsu | 348/147 |
| 5,296,926 | 3/1994 | Nagura | 348/144 |
| 5,353,055 | 10/1994 | Hiramatsu | 348/144 |

FOREIGN PATENT DOCUMENTS 0 157 414  10/1985  European Pat. Off. .

OTHER PUBLICATIONS

Patent Abstract of Japan, JP63278179, Nov. 15, 1988.
Patent Abstract of Japan, JP1293300, Nov. 27, 1989.
ESA Journal 1991, vol. 15, No. 2, "Interactive Imaging and Real–Time Pointing in an Auroral Imaging Observatory," F. Shahidi et al., pp. 141–148.

Primary Examiner—Thomas D. Lee
Attorney, Agent, or Firm—Evenson, McKeown, Edwards & Lenahan

[57] ABSTRACT

Two sensors are carried on board a spacecraft: a first, low resolution "preview" sensor, and a second high resolution "fine sensor", the latter having sensing parameters which can be adjusted to satisfy the needs of a particular customer. The instantaneous field of view of the preview sensor is located at a fixed distance ahead of that of the fine sensor, so that within a predetermined time period, users may decide which partial data are to be transmitted by the fine sensor and under which observation parameters (such as spacial resolution, spectral channels, measuring site, size of the measured area) to their earth station in near real time, still within the course of the actual overflight. Compilation of the specific data requested by the customers takes place on-board the spacecraft upon telecommands by the customers themselves. Sensing of the data requested by the customer is then performed by the fine sensor.

8 Claims, 3 Drawing Sheets

EARTH OBSERVATION METHOD

BACKGROUND AND SUMMARY OF THE INVENTION

This invention relates to a method and apparatus for space-based observation of the earth.

In previously used methods, a single earth station with corresponding transmitting and receiving devices communicates with the space segment, such as a satellite; all observation data are transmitted to the earth station and recorded. Customers' requests for remotely sensed earth observation data are processed by way of this earth station, the customer making a selection from the inventory of data present at the earth station. This method has the disadvantage that the recorded data are available to the customer only after a significant delay (hours or days). Furthermore, as a result of the global transmission of all observation data, large data stocks accumulate at the earth stations.

It is an object of the present invention to provide a method and apparatus for a space-based earth observation which provides customers of the system with faster and more convenient access to remotely sensed earth observation data.

A further objective of the invention is to provide a space-based earth observation system which permits customers to preview and select desired data, by communication directly with the spacecraft.

These and other objects and advantages achieved by the earth observation method and apparatus according to the invention, in which two sensors are carried on board a spacecraft: a first, low resolution "preview" sensor, and a second high resolution "fine sensor", the latter having sensor parameters which can be adjusted to satisfy the needs of a particular customer. The instantaneous field of view of the preview sensor is located at a fixed distance ahead of that of the fine sensor, so that within a predetermined time period, users may decide which partial data are to be transmitted by the five sensor and under which observation parameters (such as spectral resolution, spectral channel, measuring site, size of the measured area) to their earth station in near real time, still within the course of the actual overflight. Global on-board recording of data is therefore unnecessary. Compilation of the specific data requested by the customers takes place on-board the spacecraft upon telecommands by the customers themselves. Sensing of the data requested by the customer is then performed by the fine sensor. In this manner, the earth observation system according to the invention senses part of the flown-over area and offers the data to all users within whose ground station acquisition radius the spacecraft segment is situated, in real time, for the selection of customer-specific measuring targets.

The two observation sensors need not necessarily exist on the same spacecraft. The overall system for implementing the method therefore comprises one or several spacecraft which are each equipped with one or several sensors, an on-board data memory, an arbitrary number of user earth stations, a two-way communication connection between the user earth station and the space segment, as well as an earth station for system operation, also with a two-way communication connection.

The time required for acquisition, processing and delivery of data is thus reduced from the current period of several weeks to the time period within which the desired acquisition and transmission from the space segment is physically possible. The data are made available to the requesters in real time during the overflight. This method also permits simultaneous utilization of the spacecraft assets by several customers who are situated within the transmission radius of the spacecraft.

As a modification of the above-described method, it is also possible to use a single high resolution sensor. In this case all sensor data are stored for a short time (preferably, on the order of 6 minutes) in a data memory on board the spacecraft. The duration of such storage depends on the dwell time of the earth stations within the visibility range of the spacecraft. This electronic data storage system offers to the earth station in near real time an extract of the data memory content in a simple quality (that is, low resolution, low volume data which can be easily processed and previewed), which allows the earth station users to identify the application-specific data, and to request them by means of a telecommand to the space segment. Transmission of the requested data to the earth stations then takes place still during the actual overflight, while the spacecraft remains within the acquisition radius of the ground station.

In another embodiment of the invention, in which only one high-resolution observation sensor is used, the orientation of the observation sensor is determined and reported to the earth stations at regular intervals. The earth stations can them make their selection by means of precalculated future observation areas. As soon as the spacecraft enters the acquisition radius of the earth station, the observation request is transmitted to the space segment, so that observation sensor can sese and transmit the selected data on the same pass of the spacecraft over the earth station. In this manner, it is possible to preprogram the earth station based on a knowledge of future observation areas.

The user earth stations, which comprise at least a transmitting and receiving unit, a video display and a recording device, allow the user to carry out the following functions:

a) reception and display of the currently recorded sensor data in real time (and in a simple quality);

b) interactive selection of partial data sets of a specific quality;

c) communication of clients' requests to the spacecraft; and d) telemetry and storage of the customer requested data in near real time in a decentralized manner in the earth stations of the respective customers.

Communication between the earth station and the spacecraft may take place either directly or by way of an earth-based or space-based data relay station. For this purpose, customers receive an authorization for using the system from the system operator, and the individual observation tasks may then be carried out autonomously by the customers, without further intervention by the central system operator.

The method according to the invention permits the users to carry out real time observation and real time data selection. That is, the customer may make a decision whether data are to be recorded; and if so, for which measuring site, which picture cutout and other technical parameters, such as geometrical resolution, spectral channels, etc. The data desired by users are compiled on board the space segment so that only the data requested by the users must be transmitted to the users in near real time. Data which are available in the space segment but not requested by the user are not transmitted. The data sets to be transmitted in a decentralized manner may thus be limited in comparison to conventional methods. The user-side demands concerning the reception and the processing of the data may therefore also be limited, and may be adapted to the respective requirements of the users.

Other objects, advantages and novel features of the present invention will become apparent from the following detailed description of the invention when considered in conjunction with the accompanying drawings.

DETAILED DESCRIPTION OF THE DRAWINGS

Figure 1:
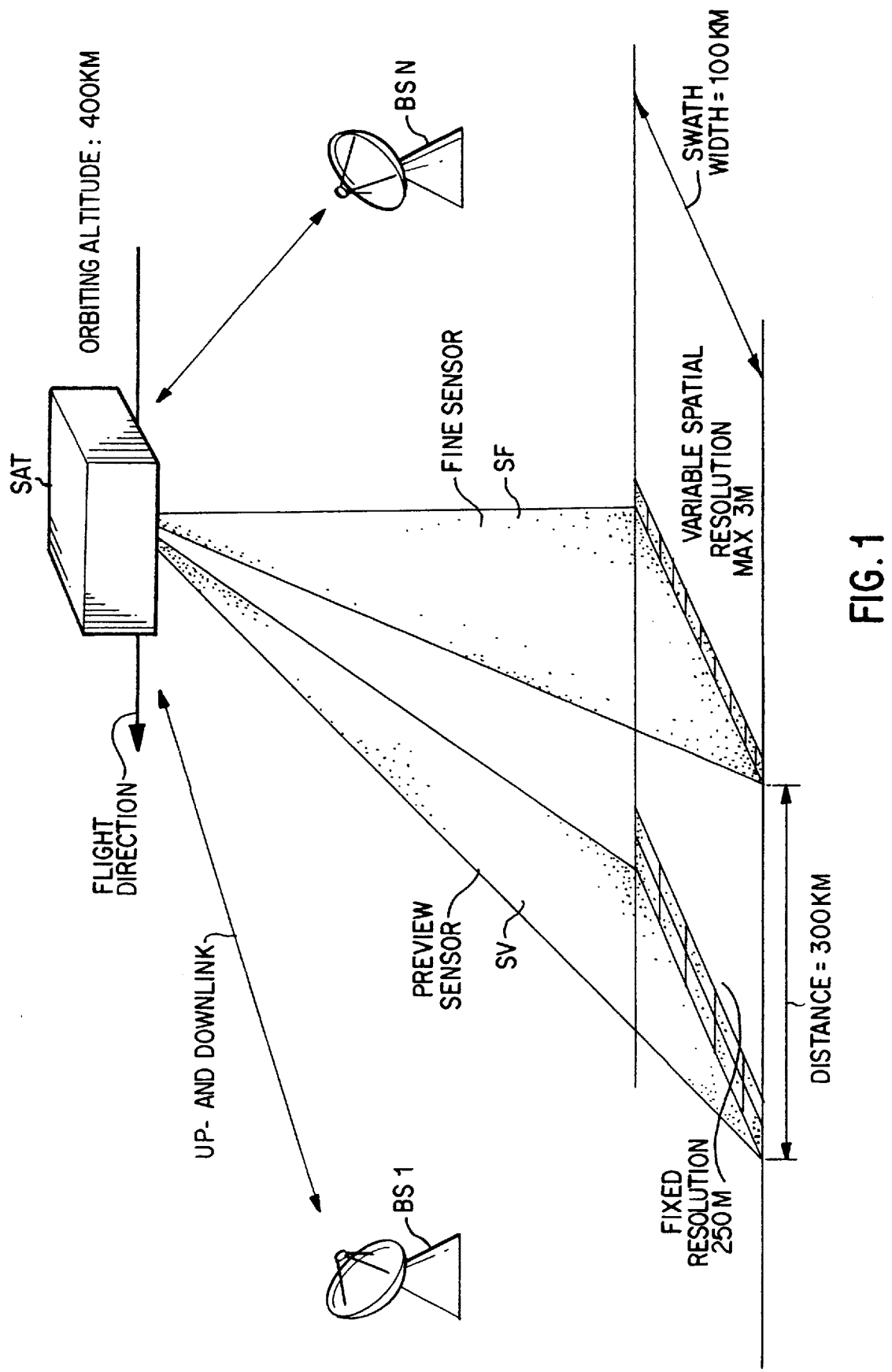
FIG. 1 is a representation of a general arrangement for carrying out the earth observation method according to the invention.

FIG. 1 represents a general overview of an arrangement for carrying out the method according to the invention. An earth observation satellite which moves at a predetermined speed with respect to the surface of the earth, carries two sensors, with the instantaneous field of view SV of the first sensor (preview low resolution sensor) moving ahead of the instantaneous field of view SF of the second sensor (fine sensor) on the earth's surface. In this example, the fine sensor SF is aligned with the nadir point, and the distance between the observation points is preferably on the order of 300 km. The two sensors cover the same width transversely to the flight direction of the spacecraft. The area on the earth surface which is continuously swept by the two sensors, referred to herein as the observation path, preferably has a width of about 100 km.

In this embodiment, the preliminary field sensor has a fixed resolution of approximately 250 m. Data from this sensor are transmitted continuously, concurrently with data acquisition, to the decentralized user earth stations BS 1–BS N, which are situated within the transmission radius of the spacecraft. This provides to the user a lower resolution preview of the area, which can later be sensed by the high-resolution fine sensor.

The resolution of the fine sensor is variable, with a maximal resolution of up to 3 m. (A single scan line of the fine sensor, transverse to the observation path, has approximately 32,000 pixels.) Upon request by the user, a certain cutout or "window" (a selected area within the observation path) of the fine sensor observation range SF can be transmitted to the user earth station BS 1, BS N in near real time. The data transmission rate is constant for all classes of earth stations and in an advantageous embodiment amounts to 1.0 Mbps.

In an advantageous embodiment, the picture or "scene" sizes supplied in real time by the satellite are constant for each sensor, for example:

| Sensor | Spectral Region | Pixel Resolution |
|---|---|---|
| Preliminary | panchromatic | 400 × N (N continuous) |
| field | multispectral | 2,000 × 2,000 |
| fine | panchromatic | 2,000 × 2,000 |

Each user earth station BS 1, BS N has a specifically assigned transmission channel so that absolute data security is achieved.

Figure 2:
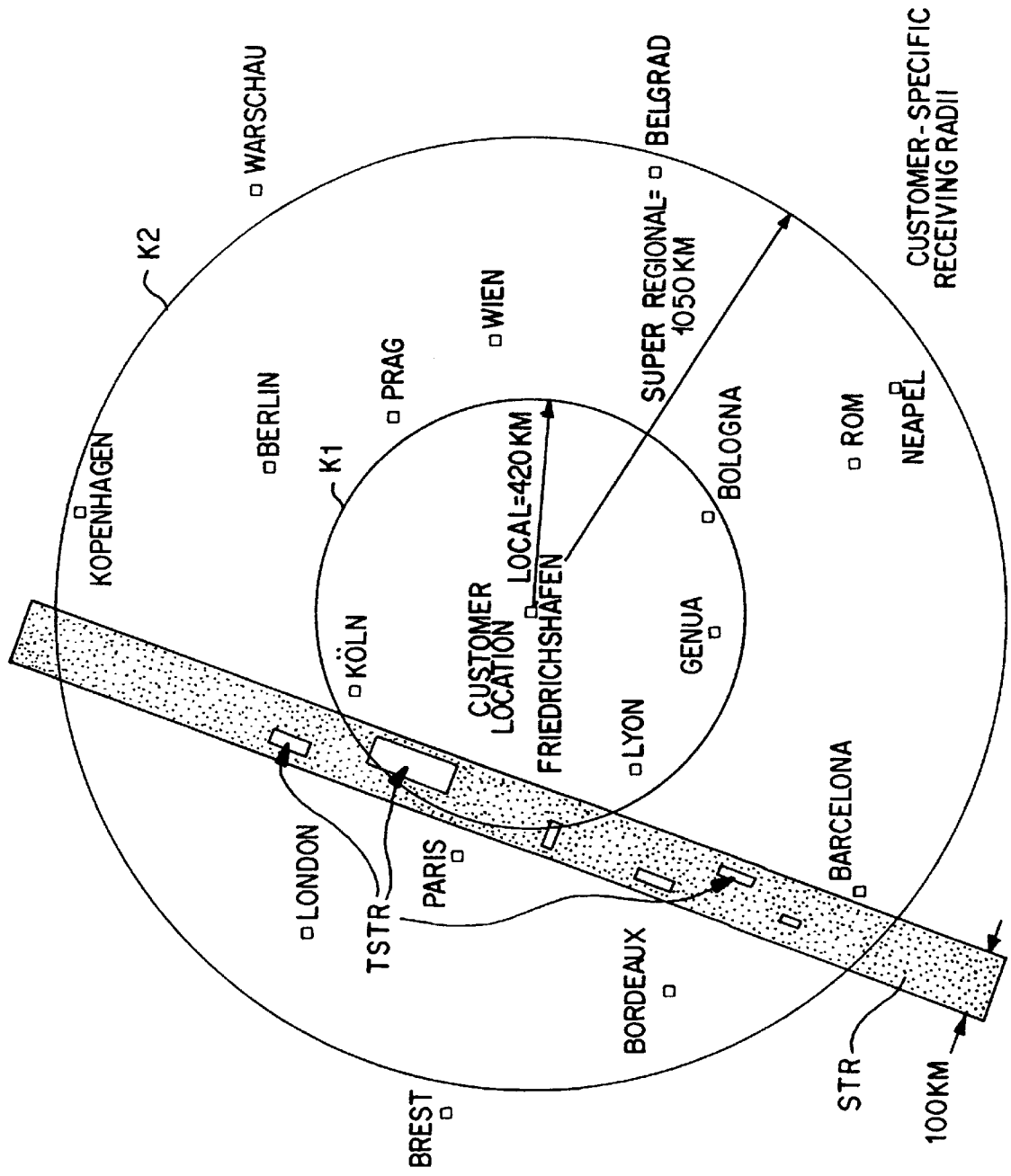
FIG. 2 is a representation of the acquisition radius of a user earth station.

FIG. 2 is a representation of possible acquisition radii for a user ground station. The location of the ground station is situated in the center of the two distance circles K1, K2. According to the acquisition radius of the earth station, a distinction is made between a local customer, a regional customer and a superregional customer. In addition, a typical observation path STR of a width of 100 km (not to scale) with included scenes or partial strips TSTR can be transmitted according to the users' requirements.

For the individual acquisition radii, the following values are required for the minimum elevation of the spacecraft and the antenna diameters of an earth station:

| Acquisition Radius | Antenna Diameter | Minimum Elevation |
|---|---|---|
| 2,100 km (superregional customer) | 3.5 m | 15 degrees |
| 1,500 km (regional customer) | 2.0 m | 25 degrees |
| 840 km (local customer) | 1.1 m | 40 degrees |

Figure 3:
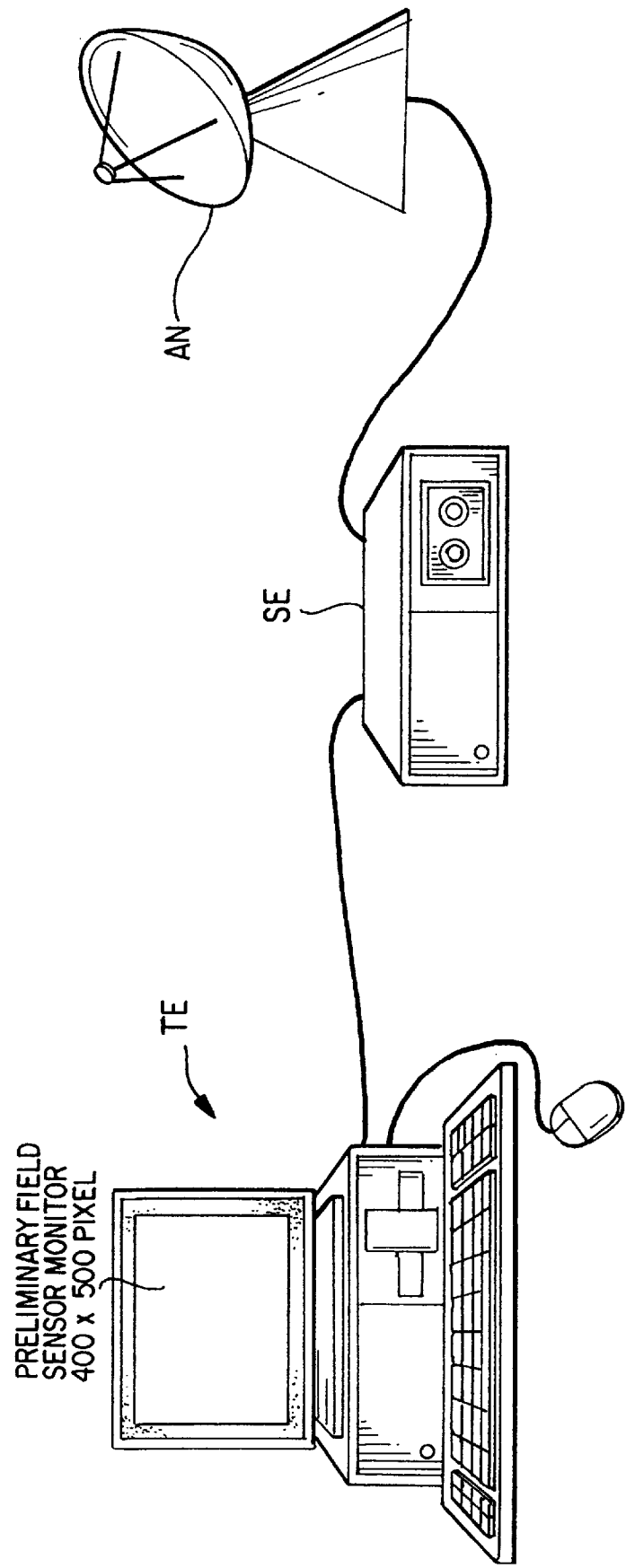
FIG. 3 is a view of the function construction of a user earth station.

FIG. 3 is a schematic representation of a typical configuration of a user earth station. It comprises a slewable antenna AN whose diameter is a function of the desired receiving radius. A transmitting/receiving device SE with an integrated data memory is connected with the antenna AN. The receiver is suitable for data transmission rates of up to 1.0 Mbps. Typically, the transmitter has a power of 0.1 watt. In this example, the data memory is constructed as a magnetic cassette tape storage device of a capacity of 500 Mbits.

A receiving terminal TE with a microcomputer and monitor is used for the representation and selection of the preliminary field sensor data. In an advantageous embodiment, it comprises the following commercially available elements:

PC 386/87
1 Gbyte hard disk
VGA Monitor
Mouse
Low-Level Image Processing S/W

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method of remote earth observation comprising the steps of continuously sensing data concerning the earth's surface in an area which follows a predetermined path using a first earth observation sensor;

transmitting said data sensed by said first sensor, concurrently with said sensing to ground stations currently within a reception radius;

making a selection of a desired data set at a ground station based on information contained in said data sensed by said first sensor;

transmitting said selection of said desired data set to a second earth observation sensor which continuously senses data concerning the earth's surface in an area which follows the same predetermined path as said first earth observation sensor at a predetermined distance behind said first earth observation sensor, wherein the path continuously scanned by said second sensor is coincident with the path continuously scanned by said first sensor;

causing said second earth observation sensor to acquire said desired data set and to transmit it to said ground station.

2. Method according to claim 1 wherein said first and second earth observation sensor are carried on-board at least one spacecraft.

3. Method according to claim 2 wherein said first and second observation sensors are carried on-board a single earth spacecraft.

4. Method according to claim 1 wherein said first earth observation sensor has fixed sensing parameters and said second earth observation sensor has adjustable sensing parameters, and wherein said selection of said desired data set includes a specification of desired sensing parameters.

5. Method according to claim 3 wherein said first earth observation sensor has fixed sensing parameters and said second earth observation sensor has adjustable sensing parameters, and wherein said selection of said desired data set, includes a specification of desired sensing parameters.

6. Method according to claim 4 wherein said sensing parameters include at least spatial resolution, spectral band selection, desired geographic location and size of desired area coverage.

7. Method according to claim 1 wherein said predetermined distance is sufficient to permit adequate time for said selection of the data set, between time when said first earth observation sensor senses a particular point on the earth and when said second earth observation sensor senses said particular point.

8. Method according to claim 7 wherein said predetermined distance is approximately 300 km.

* * * * *